United States Patent [19]
Duback et al.

[11] Patent Number: 5,480,376
[45] Date of Patent: Jan. 2, 1996

[54] CUSTOM BODY PROTECTIVE PAD WITH CURE-RETARDING STORAGE SYSTEM

[75] Inventors: Jeffrey E. Duback, Davidson; Eric D. Vaughter; A. Bruce Parker, both of Charlotte, all of N.C.

[73] Assignee: Parker Medical Associates, Charlotte, N.C.

[21] Appl. No.: 306,811

[22] Filed: Sep. 15, 1994

Related U.S. Application Data

[63] Continuation-in-part of Ser. No. 252,740, Jun. 2, 1994, which is a continuation-in-part of Ser. No. 860,005, Mar. 30, 1992, abandoned.

[51] Int. Cl.$^6$ ........................................................ B32B 7/00
[52] U.S. Cl. ........................... 602/8; 602/6; 220/438; 428/68; 428/76; 428/246; 428/251; 428/285
[58] Field of Search ...................... 602/5, 6, 8; 428/246, 428/251, 285; 220/438

[56] References Cited

U.S. PATENT DOCUMENTS

| | | | |
|---|---|---|---|
| 4,411,262 | 10/1983 | von Bonin et al. | 128/90 |
| 4,770,299 | 9/1988 | Parker | 206/409 |
| 4,899,738 | 2/1990 | Parker | 128/90 |

FOREIGN PATENT DOCUMENTS

| | | | |
|---|---|---|---|
| 061642 | 10/1982 | European Pat. Off. | A61F 13/04 |
| 286426 | 10/1988 | European Pat. Off. | A61F 13/04 |

*Primary Examiner*—James J. Bell
*Attorney, Agent, or Firm*—W. Thad Adams, III

[57] ABSTRACT

A protective pad assembly for being custom-fitted to a body part to be protected. The assembly includes first and second protective pads, each of the first and second pads having an initially flexible layer comprised of a fabric impregnated with a moisture-curable resin which hardens upon curing to form a rigid structure of the fabric which retains a body part-defined shape into which it is molded during curing. First and second inner storage pouches are provided. Each of the first or second protective pads are sealed in respective ones of the first and second storage pouches. The first and second storage pouches having moisture-transmission retarding properties. A single, outer moisture-proof protective pouch is provided within which the pads and the inner pouches are sealed in the absence of moisture until the pad is to be molded to the body part to be protected.

10 Claims, 6 Drawing Sheets

CUSTOM BODY PROTECTIVE PAD WITH CURE-RETARDING STORAGE SYSTEM

TECHNICAL FIELD AND BACKGROUND OF THE INVENTION

This application is a continuation-in-part of application Ser. No. 08/252,740, filed on Jun. 2, 1994, which is a continuation-in-part of application Ser. No. 860,005, filed on Mar. 30, 1992 now abandoned.

This invention relates to a custom-fitted body protective device such as a shin, thigh, or arm pad used to protect against injuries to sports participants, and to protect previous injuries which sports competition continues. The disclosure of this application includes a package in which a pair of pads, such as shin protectors, are contained for ease of sale, distribution and use. This is a convenient manner in which to distribute the product, since the pads are ordinarily used in pairs—one for each leg.

The invention of this application enhances and improves the fit of the pad by retarding the curing of a second pad contained in the package, while a first one is being fitted to the wearer. The particular embodiments shown in the application include protectors for the lower portion of the leg, and include protectors of the type to be used by soccer players during competition. The invention has application in any field—including non-sports related activities—which require or make desirable an accurate custom fit between the protective pad and the body member. The invention takes advantage of polymer chemistry to permit quick and easy molding of a pad to the body part to be protected. Shock attenuation is increased since the custom fit provides spreads contact between the protective pad and the body member over a wider surface area.

Prior art body protectors include numerous types of guards which are fitted over the body part, such as the shin. These pads typically include a soft component to place near the skin and a hard, shell-like outer cover. The soft component is intended not only to provide a cushion, but also to accommodate itself to the varying configurations of differing sized and shaped body parts. For this reason, the cushioned part is substantially greater in thickness than required merely to provide the required amount of shock attenuation. Such pads are sufficiently "generic" that they are required to be held in place by straps or bands.

Other prior art devices include pads which are constructed of thermosetting materials, which are heated and then formed to the body while heated. These products require a source of heat, and are susceptible to either over-or-under-heating. In addition, body heat itself can soften or at least increase the flexibility of the pad, thereby decreasing the effectiveness of the protection offered by the pad. Some prior art pads include air bladders which provide an air cushion against injurious blows. Other prior art devices have a plurality of connected-together segments which are hinged for limited movement relative to each other, on the theory that such movement permits the pad to more closely conform to the body part. All of these prior art devices achieve only an approximation of a truly proper and anatomically correct fit.

The present invention permits quick and easy application of a protective pad to a body part in such a way as to achieve a true custom fit. The moisture curable resin system used results in a very rigid pad, which holds the shape of the molded pad to a very high degree. No heat is required, and a source of water is the only additional substance necessary to achieve a cure. Atmospheric moisture alone will cure the pad into its hardened position in a relatively short period of time, but the resin in or on the pad will typically be activated by dipping in water. For this reason, if two or more devices are to be packaged together for use, it has been found that the second device may sometimes harden somewhat while the first device is being applied to the body part to be protected merely by exposure to atmospheric moisture. Thus, some means of retarding the curing of the second pad is desirable.

SUMMARY OF THE INVENTION

Therefore, it is an object of the invention to provide a body protective pad which can be molded to a body part to be protected.

It is another object of the invention to provide two or more body protective pads for use at the same time, and which are packaged in a single moisture-impervious package for ease of removal and use.

It is another object of the invention to provide a body protective pad which hardens in the presence of moisture to form a very rigid but very lightweight protective pad.

It is another object of the invention to provide a body protective pad which can be worn without the need for the pad to be held into place by straps or belts.

It is another object of the invention to provide a body protective pad which is stored in a moisture-proof pouch until ready for application to the body part to be protected, and which is also stored in a secondary, cure-retarding inner package within the moisture-proof pouch.

It is another object of the invention to provide a body protective pad which is suitable for protecting against injury, and protecting injuries against further damage.

These and other objects of the present invention are achieved in the preferred embodiments disclosed below by providing a protective pad assembly for being custom-fitted to a body part to be protected. The assembly includes first and second protective pads, each of the first and second pads having an initially flexible layer comprised of a fabric impregnated with a moisture-curable resin which hardens upon curing to form a rigid structure of the fabric which retains a body part-defined shape into which it is molded during curing. First and second inner storage pouches are provided. Each of the first or second protective pads are sealed in respective ones of the first and second storage pouches. The first and second storage pouches having moisture-transmission retarding properties. A single, outer moisture-proof protective pouch is provided within which the pads and the inner pouches are sealed in the absence of moisture until the pad is to be molded to the body part to be protected.

According to one preferred embodiment of the invention, the protective pad includes a flexible inner cushion layer positioned on one side of the resin-impregnated layer for being placed closest to the body member and a flexible outer layer positioned on the side of the resin impregnated layer opposite the inner cushion layer.

According to another preferred embodiment of the invention, the fabric comprises a plurality of overlaid thicknesses of fiberglass.

According to yet another preferred embodiment of the invention, the plurality of thicknesses of fiberglass comprises at least five thicknesses and no more than seven thicknesses.

According to yet another preferred embodiment of the invention, the first and second inner storage pouches are constructed of plastic film.

Preferably, the plastic film has a thickness of between 1.5 mils and 4 mils.

Preferably, the outer moisture-proof protective pouch is formed of a laminated structure having at least one layer of plastic film and at least one layer of aluminum foil bonded to the plastic film.

According to one preferred embodiment of the invention, a protective pad assembly is provided for being custom-fitted to a body part to be protected, and includes first and second protective pads, each of the first and second pads having an initially flexible layer comprised of a fabric impregnated with a moisture-curable resin which hardens upon curing to form a rigid structure of the fabric which retains a body part-defined shape into which it is molded during curing. First and second inner storage pouches are provided, and are constructed of a plastic film having moisture-transmission retarding properties. Each of the first or second protective pads are sealed in respective ones of the first and second storage pouches. A single, outer moisture-proof protective pouch within which the pads and the inner pouches are sealed in the absence of moisture until the pad is to be molded to the body part to be protected. The outer moisture-proof protective pouch is formed of a laminated structure having at least one layer of plastic film and at least one layer of aluminum foil bonded to the plastic film.

According to another preferred embodiment of the invention, the plastic film has a thickness of between 1.5 mils and 4 mils, and the at least one plastic film layer has a thickness of 2 mils and the aluminum foil layer has a thickness of 0.00035 inches.

According to yet another preferred embodiment of the invention, the outer moisture-proof protective pouch includes a laminated layer of nylon film.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
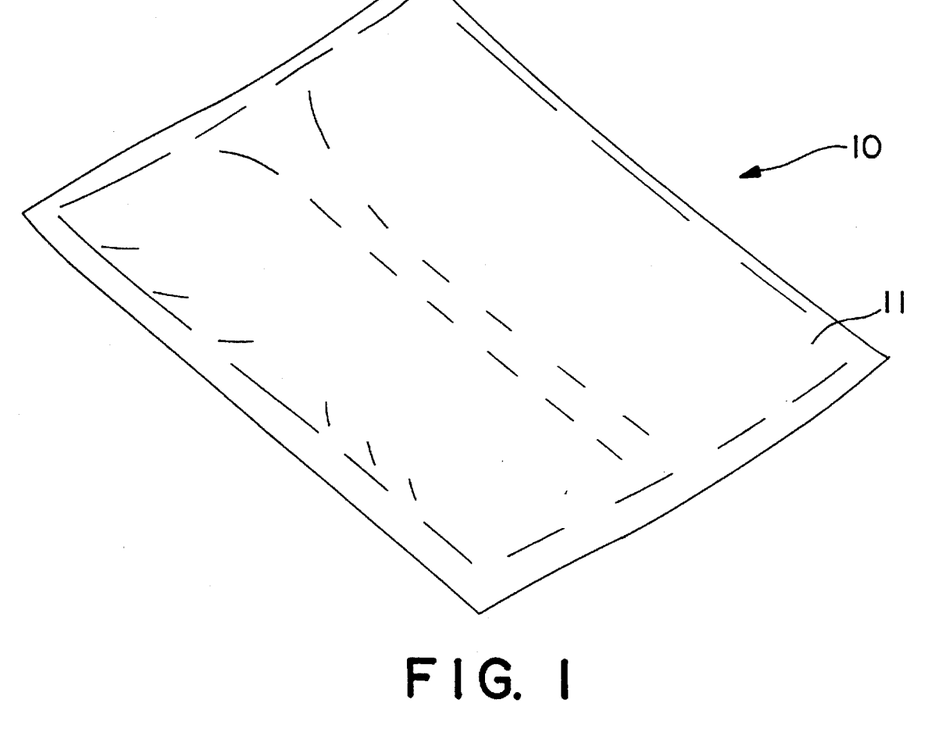
FIG. 1 is a perspective view showing the outer, moisture proof packaging within which the protective pads according to the invention may be stored until use.

Referring now specifically to the drawings, FIG. 1 illustrates a protective pad assembly 10 according to an embodiment of the invention. The pad assembly 10 includes as its outermost protective enclosure an outer moisture-impervious foil and laminated pouch 11 in which the other components are sealed in the absence of moisture. The preferred structure of the outer moisture-impervious pouch 11 includes a 0.5 mil aluminum foil sheet sandwiched between two layers of low density polyethylene film, each layer having a thickness of 2 mils. Additionally, the pouch 11 can include an outer layer of laminated 60 gauge bi-axially oriented nylon film. This laminate structure, when properly sealed, will prevent moisture intrusion indefinitely.

Figure 2:
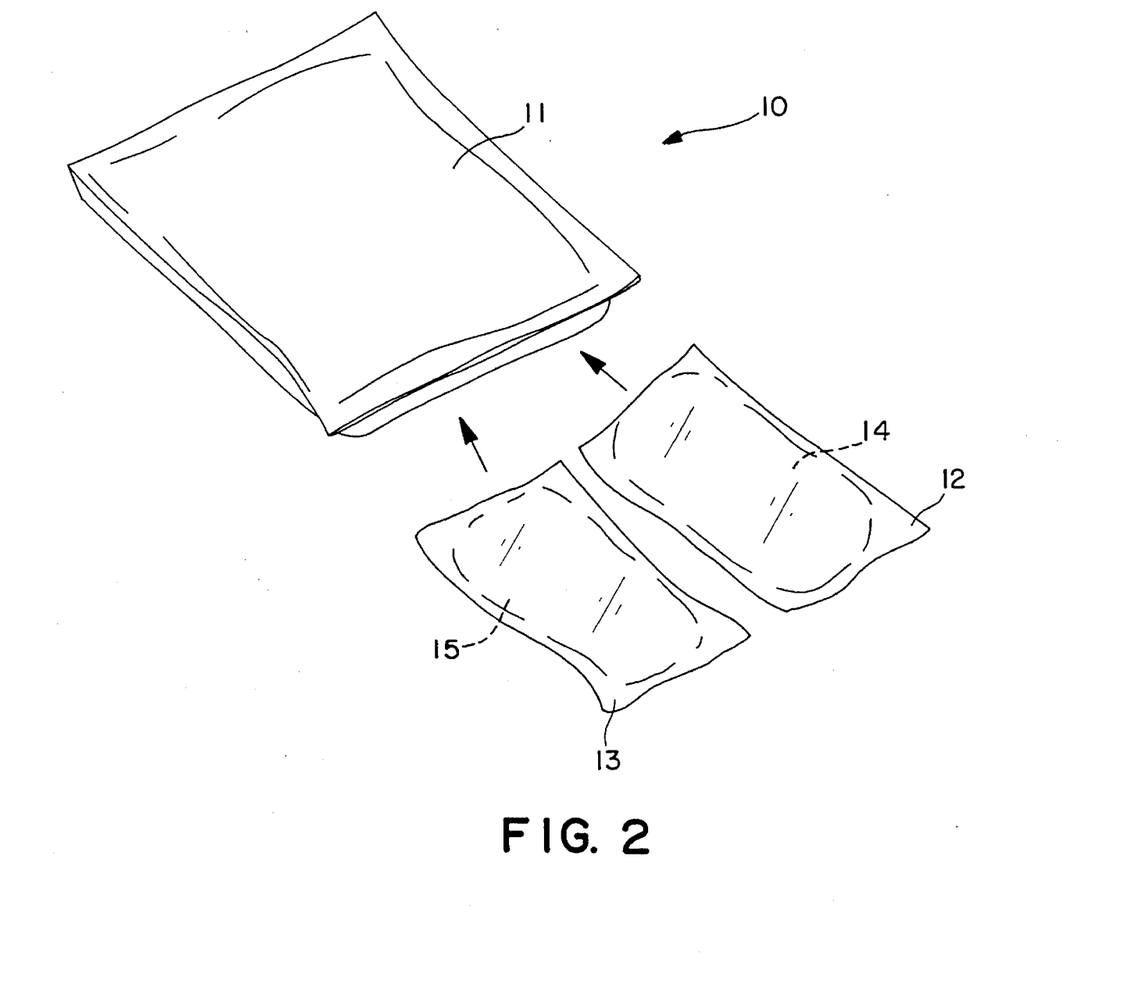
FIG. 2 is an exploded perspective view showing the outer, moisture proof packaging within which the protective pads are stored, and the inner, moisture-retardant pouches in which the pads are also contained.
Figure 3:
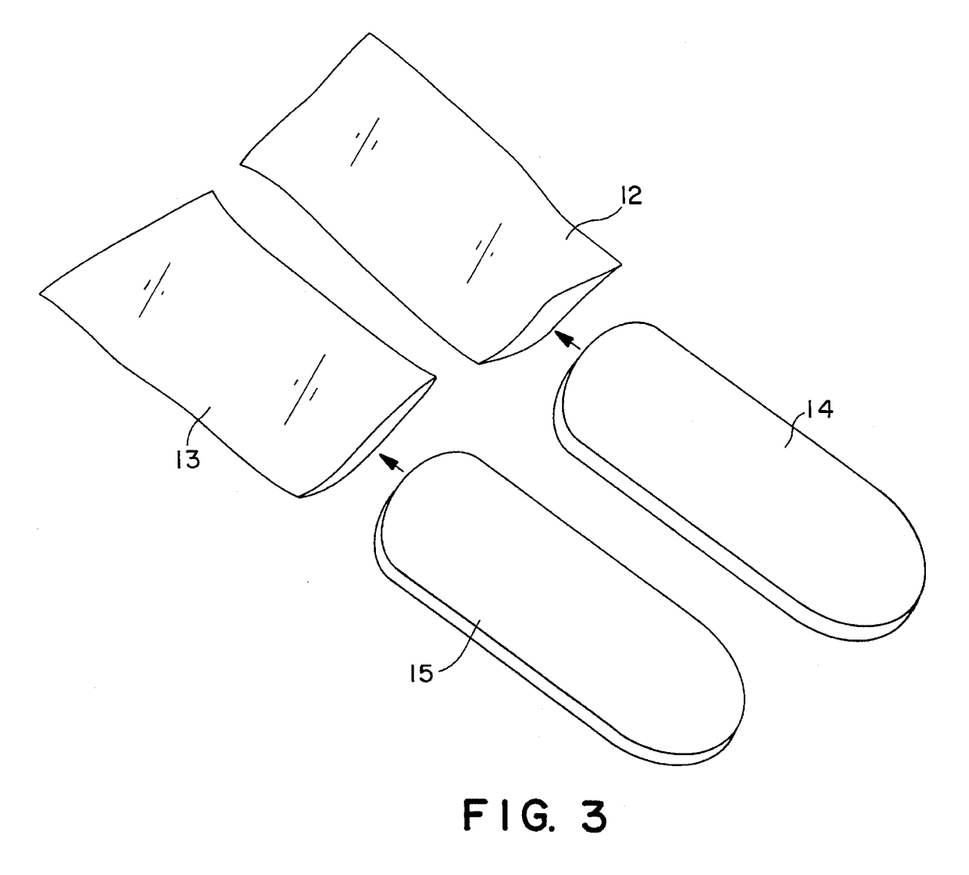
FIG. 3 is an exploded perspective view showing the inner moisture-retardant packaging within which the protective pads are stored, and the protective pads themselves.

Referring now to FIGS. 2 and 3, the outer pouch 11 contains two inner, moisture-retardant plastic film pouches 12 and 13, in which are sealed respective protective pads 14 and 15. The preferred embodiment of the plastic film from which the pouches 12 and 13 are constructed is a 1.5 mil low density polyethylene, with thicknesses up to 4 mils suitable, as well. The pouches 12 and 13 are sufficiently thin and porous that moisture will penetrate, but the penetration is sufficiently retarded in comparison with exposure directly to atmospheric humidity that curing occurs at a greatly reduced rate.

The pads 14 and 15 are sealed in the inner pouches 12 and 13 in the absence of moisture immediately prior to the inner pouches containing the pads 14 and 15 being sealed into the outer, moisture impervious pouch 11. Assembled in this manner, the protective pad assembly 10 permits the pads 14 and 15 to be sold in pairs and in such a manner that they have an indefinite shelf life.

The pads 14 and 15 have an intermediate layer which is coated or impregnated with a moisture-curable resin which is flexible in the absence of moisture, but which rapidly hardens when exposed to moisture. This is described in further detail below.

Figure 4:
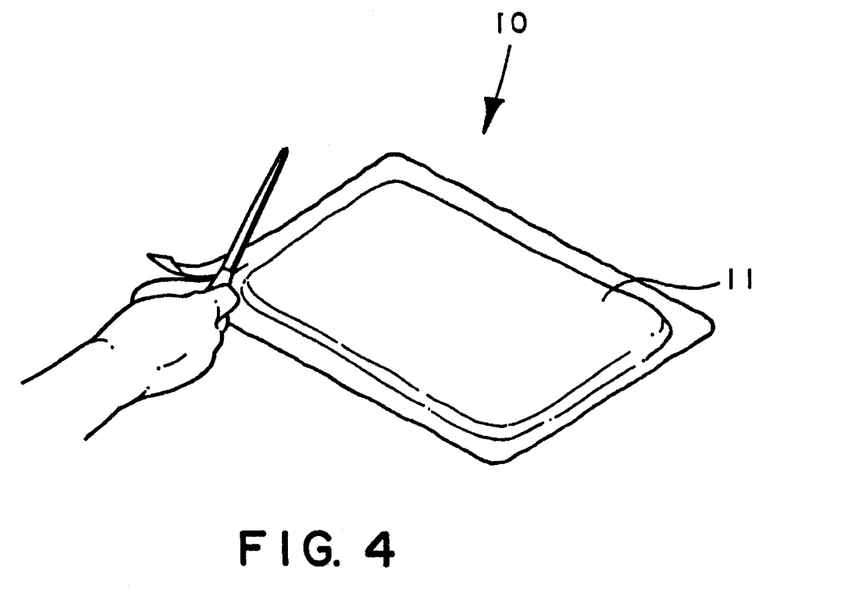
FIG. 4 is a perspective view showing the opening of the outer, moisture-proof pouch to remove the inner, moisture-retardant pouches.

The moisture-impervious foil and plastic laminated pouch 11 is opened with scissors or a knife, as shown in FIG. 4, and the inner moisture retardant pouches 12 and 13 are removed. Pouch 12 is opened, while pouch 13 is left sealed. This greatly retards penetration of moisture into the pad 14 while pad 15 is formed to the body part to be protected.

Figure 5:
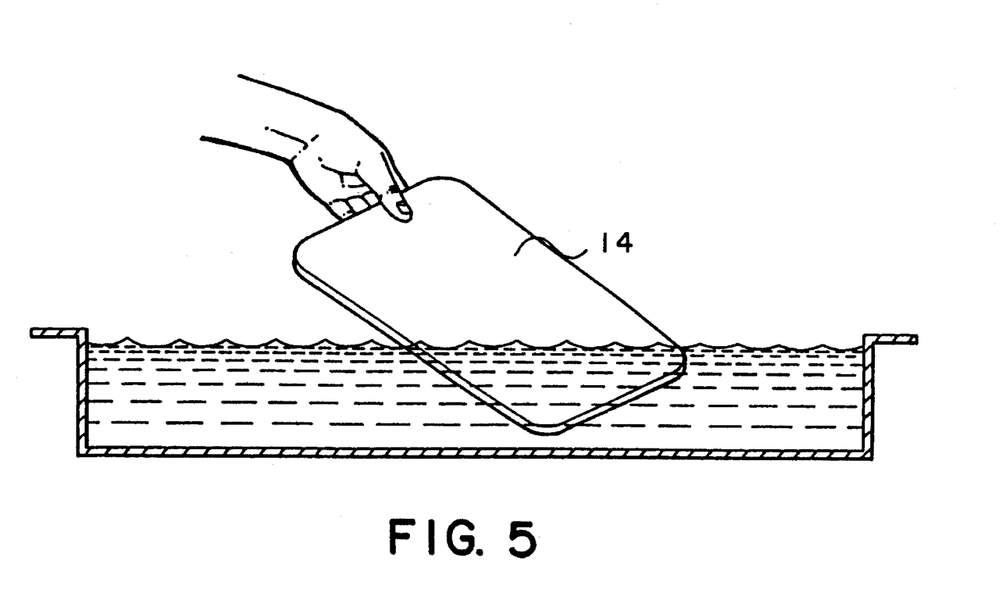
FIG. 5 illustrates that the protective pad is wetted in water before application.
Figure 6:
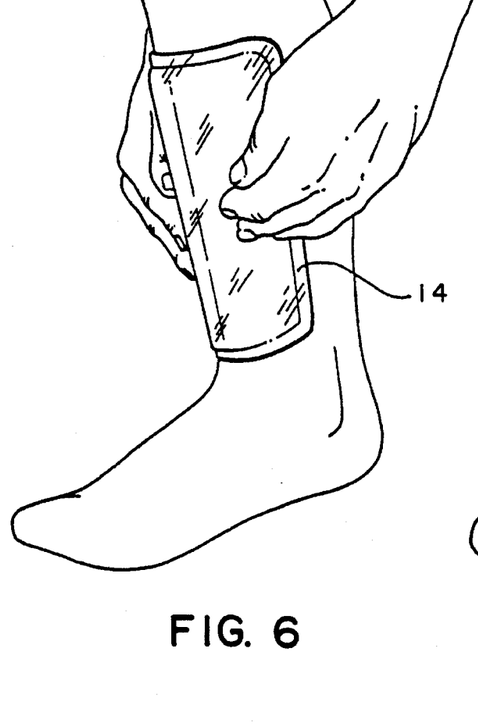
FIG. 6 is a perspective view of a protective pad according to an embodiment of the invention, with parts broken away and with the fiberglass intermediate layer enlarged for clarity.
Figure 7:
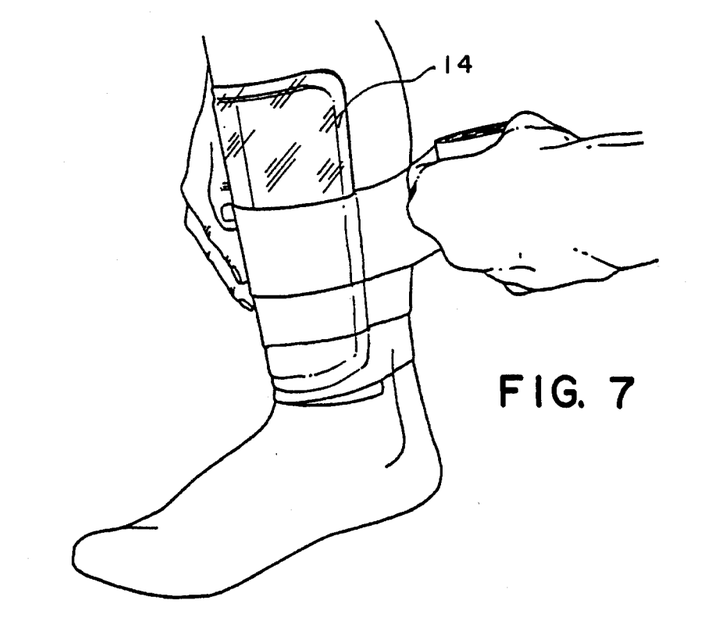
FIGS. 7, 8 and 9A are sequential perspective views of a protective pad according to one embodiment of the invention being molded to the lower part of the leg.

As is shown in FIG. 5, the pad 14 is dipped in water to activate the moisture-curable resin with which the pad is impregnated or coated. The wet pad 14 is then applied to the body part to be protected. As is shown in FIG. 6, the pad 14 is applied to the shin of the leg and held there while it is overwrapped with, for example, an elastic bandage, as is shown in FIG. 7. The pad 14 will harden within a matter of minutes, and will retain the conformation in which it was held during curing.

The pouch 13 can be opened immediately after application of the pad 14, or can be opened up to several hours later without significant hardening of the pad 15. When pouch 13 is opened, the pad 15 is removed and applied to the other leg as described above with reference to pad 14. Since both pads 14 and 15 are identical in structure and are applied in the same manner, further description of the invention refers only to pad 14.

Figure 8:
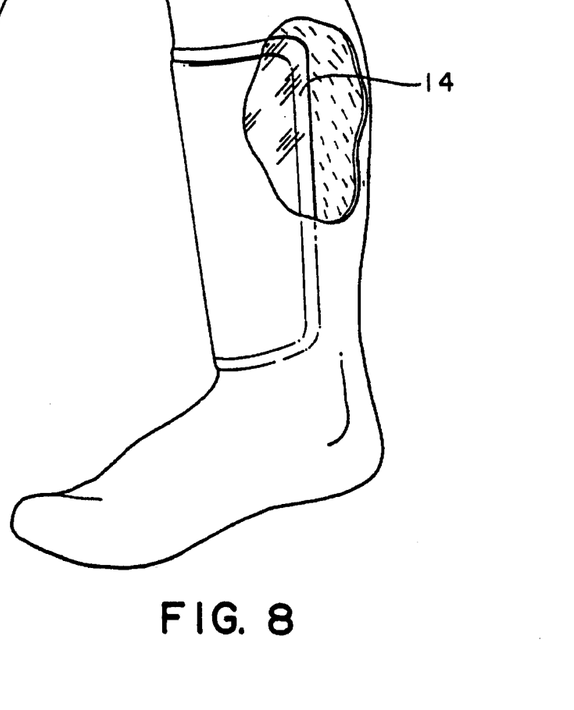

The pad 14 can be worn directly next to the skin and under, for example, a game sock as shown in FIG. 8. Since the pad 14 was molded directly next to the skin, the fit is virtually perfect, and fits so well that straps or belts are not ordinarily needed. The pad 14 is held in place by the sock and the adherence of the pad 14 to the corresponding shape of the shin.

Alternatively, the pad 14 can be worn over an undersock. Ordinarily, pad 14 will fit acceptably over the undersock even if molded directly over the skin. However, the pad 14 can be molded onto the shin while the wearer is wearing an undersock, if the pad 14 is to be normally worn over an undersock.

Figure 9A:
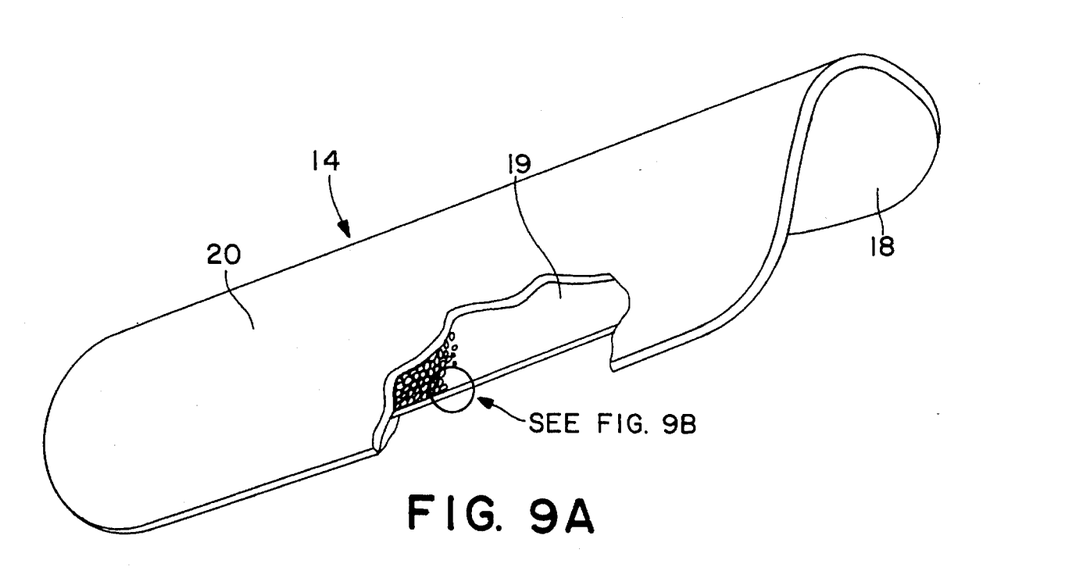
Figure 9B:
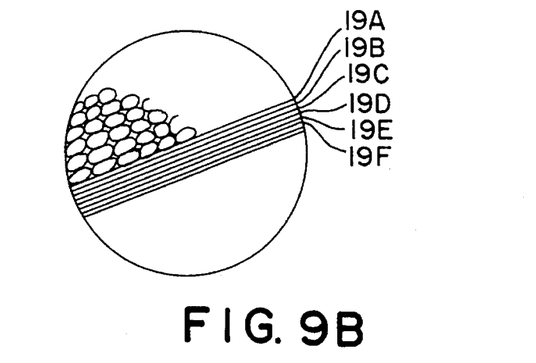
FIG. 9B is an enlarged fragmentary view of the pad shown in FIG. 9A.

Referring now to FIG. 9A, the pad 14 is illustrated and described more specifically. Pad 14 is shown in its molded configuration after the steps carried out as described with reference to FIGS. 1–8. Pad 14 is a multi-layer protective pad for being custom-fitted to a body member to be protected, for example, the shin of the leg. A flexible inner cushion layer 18 is provided for being placed closest to the body member. Inner cushion layer 18 is preferably a laminated one-eighth inch to one-half inch, six pound EVA (ethylene vinyl acetate) with a heavy knitted covering, such as a product known as Tietex. Holes may be provided for ventilation. The cushioning provides a comfortable surface next to the skin or under sock. The EVA is flexible enough to bend easily with the other components of the pad 14.

An initially flexible intermediate layer 19 is bonded to the inner cushion layer 18. The intermediate layer 19 is preferably formed of fiberglass fabric layers 19A–F impregnated with a moisture-curable resin which hardens upon curing to form a rigid structure which retains shape of the body part onto which it is molded during curing. The particular embodiment illustrated in this application contains six layers of fiberglass fabric, but many other variations are equally suitable.

The fiberglass fabric 19 is impregnated or coated with a moisture-curable resin such as polyisocyanate as described in full in the present applicant's U.S. Pat. No. 4,770,299. This reactive system remains stable when maintained in substantially moisture-free conditions, such as in the moisture-impervious pouch 11, but hardens upon exposure to sufficient moisture to form a rigid, self-supporting structure. A typical formulation of the reaction system is set forth in the following table:

| Typical Formulation: | | | |
|---|---|---|---|
| Isonate↓ 143L | or | | |
| Mondur↓ CD | or | polyisocyanate | 50.0% |
| Rubinate ↓ XI168 | | | |
| Pluracol↓ P1010 | | polyol | 46.6% |
| DC-200 Silicone | | defoaming agent | 0.30% |
| Benzoyl Chloride | | stabilizer | 0.10% |
| Thancat↓ DM-70 | | catalyst | 3.0% |
| | | | 100% |

A complete discussion of the parameters of the reactive system, the manner of production and the variables which apply are found in U.S. Pat. No. 4,411,262.

The polyisocyanate resin remains in a viscous, liquid unhardened state so long as the resin is not exposed to moisture. This permits the fiberglass intermediate layer 19 and any flexible structure, such as the inner cushion layer 18, bonded to the fiberglass to remain flexible and moldable so long as the resin is not exposed to moisture, and for a relatively short period of time after exposure to moisture. The curing time can be controlled to some extent by the quantity of water to which the resin is exposed. For example, exposure to water by dipping will result in quite rapid curing, while merely allowing the resin to be exposed to air will cause long curing times proportional to the amount of humidity in the air to which it is exposed.

In accordance with the invention, the individual fiberglass fabric layers 19A–F are preferably die-cut to shape. The various fabric layers 19A–F may have the same or different widths, and the degree of overlap and non-overlap resulting from the differing widths has the effect of providing variable thickness with a relatively thick predetermined area where increased rigidity is desirable and a relatively thin area where increased flexibility is desirable. The manner varying the widths of the fabric layers 19A–F is described in detail in Applicant's application Ser. No. 08/252,740.

Alternatively, some of the layers 19A–F may be of other material, such as polypropylene, which offers additional flexibility and some cost savings in material.

As is also shown in FIG. 9A, a flexible outer layer 20 is bonded to the intermediate layer 19 and is held by the intermediate layer 19 in the same body-part defined shape as the intermediate layer 19. The outer layer 20 is preferably a polyester double-knit fabric having "all way" stretch. Bonding of the layers 18, 19 and 20 is accomplished with polyurethane adhesive.

The two outer components of the protective pad 14—the inner cushion layer 18 and the outer layer 20—are seamed together into a closed envelope with a relatively close overedge seam enclosing the intermediate fiberglass layer 19 inside without actually catching the intermediate fiberglass layer within the stitches.

The particular embodiments disclosed above are for purposes of illustration. Many other variations are possible while remaining within the scope of the invention. The number of layers of fiberglass in the intermediate layer can be varied to take into account anticipated use conditions. Also, as mentioned above, other materials such as polypropylene can be used in substitution for some of the layers. Also, even though the stitches by which the layers are held together are not shown in the Figures, is understood that the layers will be stitched together with wide, loose stitches to keep the layers together as a unit while permitting shifting as needed permit the layers to conform to the curvature of the body part to which the pad is being molded.

A protective pad for being molded onto a body part to be protected is described above. Various details of the invention may be changed without departing from its scope. Furthermore, the foregoing description of the preferred embodiment of the invention and the best mode for practicing the invention are provided for the purpose of illustration only and not for the purpose of limitation— the invention being defined by the claims.

We claim:

1. A protective pad and storage pouch assembly for being custom-fitted to a body part to be protected, and comprising:

(a) first and second protective pads, each of said first and second pads having an initially flexible layer comprised of a fabric impregnated with a moisture-curable resin which hardens upon curing to form a rigid structure of the fabric which retains a body part-defined shape into which it is molded during curing;

(b) first and second inner storage pouches, each of said first or second protective pads being sealed in respective ones of the first and second storage pouches, said first and second storage pouches having moisture-transmission retarding properties; and (c) a single, outer moisture-proof protective pouch within which elements (a) and (b) are sealed in the absence of moisture until the pad is to be molded to the body part to be protected.

2. A protective pad assembly according to claim 1, wherein said protective pad includes a flexible inner cushion layer positioned on one side of the resin-impregnated layer for being placed closest to the body member and a flexible outer layer positioned on the side of the resin impregnated layer opposite the inner cushion layer.

3. A protective pad assembly according to claim 1, wherein said fabric comprises a plurality of overlaid thicknesses of fiberglass.

4. A protective pad assembly according to claim 3, wherein said plurality of thicknesses of fiberglass comprises at least five thicknesses and no more than seven thicknesses.

5. A protective pad assembly according to claim 1, 2, 3 or 4, wherein said first and second inner storage pouches are constructed of plastic film.

6. A protective pad assembly according to claim 5, wherein said plastic film has a thickness of between 1.5 mils and 4 mils.

7. A protective pad assembly according to claim 1, 2, 3 or 4, wherein said outer moisture-proof protective pouch is formed of a laminated structure having at least one layer of plastic film and at least one layer of aluminum foil bonded to the plastic film.

8. A protective pad and storage pouch assembly for being custom-fitted to a body part to be protected, and comprising:

(a) first and second protective pads, each of said first and second pads having an initially flexible layer comprised of a fabric impregnated with a moisture-curable resin which hardens upon curing to form a rigid structure of the fabric which retains a body part-defined shape into which it is molded during curing;

(b) first and second inner storage pouches constructed of a plastic film having moisture-transmission retarding properties, each of said first or second protective pads being sealed in respective ones of the first and second storage pouches; and (c) a single, outer moisture-proof protective pouch within which elements (a) and (b) are sealed in the absence of moisture until the pad is to be molded to the body part to be protected, said outer moisture-proof protective pouch formed of a laminated structure having at least one layer of plastic film and at least one layer of aluminum foil bonded to the plastic film.

9. A protective pad assembly according to claim 8, wherein said plastic film has a thickness of between 1.5 mils and 4 mils, and wherein the at least one plastic film layer has a thickness of 2 mils and said aluminum foil layer has a thickness of 0.5 mils.

10. A protective pad assembly according to claim 8, wherein said outer moisture-proof protective pouch includes a laminated layer of nylon film.

* * * * *